F. A. ROSS.
DEMOUNTABLE PUMP.
APPLICATION FILED NOV. 25, 1914.

1,239,625.

Patented Sept. 11, 1917.

Witness:

Inventor:
Frank A. Ross,
by Burton & Burton
his Attys

UNITED STATES PATENT OFFICE.

FRANK A. ROSS, OF EVANSTON, ILLINOIS, ASSIGNOR TO STEWART-WARNER SPEEDOMETER CORPORATION, OF CHICAGO, ILLINOIS, A CORPORATION OF VIRGINIA.

DEMOUNTABLE PUMP.

1,239,625.

Specification of Letters Patent.

Patented Sept. 11, 1917.

Application filed November 25, 1914. Serial No. 873,953.

*To all whom it may concern:*

Be it known that I, FRANK A. ROSS, a citizen of the United States, residing at Evanston, in the county of Cook and State of Illinois, have invented new and useful Improvements in Demountable Pumps, of which the following is a specification, reference being had to the accompanying drawings, forming a part thereof.

This invention relates to an air pump designed for inflating the tires of an automobile, and especially to features whereby the pump may be removably mounted on the protruding end of the engine crank shaft and driven thereby. Such a pump is obviously applicable to other uses in analogous situations, however, and the invention as set out in the following description and defined in the accompanying claims is not strictly limited to the specific form illustrated by the drawings.

In the drawings:—

Figure 1:
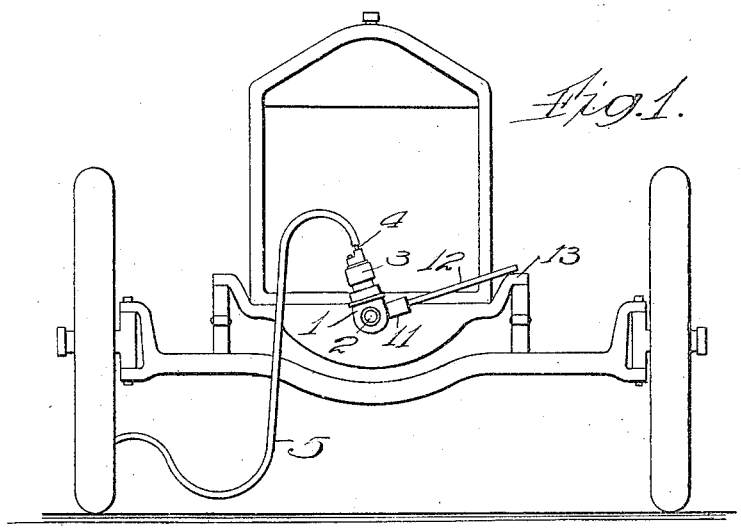
Figure 1 is a front elevation of an automobile and an air pump embodying this invention applied thereto in the position of use.
Figure 2:
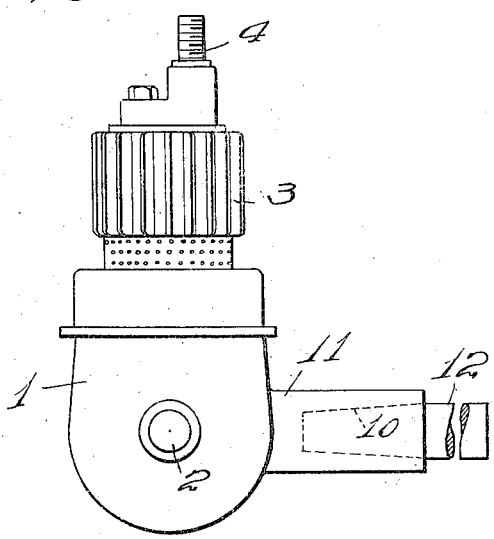
Fig. 2 is an enlarged front elevation of the air pump.
Figure 3:
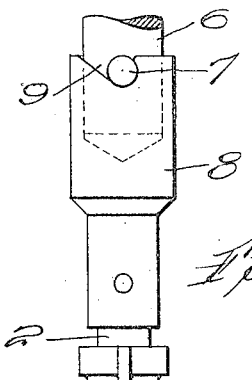
Fig. 3 is a top plan view of the pump showing the coupling sleeve and the end portion of the engine crank shaft with which it is engaged.

The pump chosen to illustrate this invention is of the one-cylinder type comprising a casing, 1, for the crank shaft, 2, and a cylinder, 3, having a nipple, 4, to which the air hose, 5, is coupled, as shown in Fig. 1. In most automobiles a portion of the end of the engine crank shaft, 6, protrudes from the vehicle body to receive the usual engine starting crank, not shown, and this protruding portion of the shaft is generally provided with a cross pin, 7, or some corresponding feature for operative engagement with the removable starting crank. This invention is designed to take advantage of this construction by providing the crank shaft, 2, of the pump with a coupling sleeve, 8, rigidly secured to the shaft, 2, and having an outer end formed to engage the cross pin, 7, of the engine crank shaft, 6, as by means of notches, 9, as shown in Fig. 3. The pump is small and light and may be carried in the tool box of the vehicle when not in use; and when desired for inflating the tires, or for other purposes, it may be put into service merely by slipping the coupling sleeve, 8, over the end of the crank shaft, 6, so as to bring the notches, 9, into engagement with the cross pin, 7. Thus the rotation of the engine shaft will be communicated to the crank shaft, 2, and the pump will operate to supply compressed air to the air hose, 5. To prevent rotation of the pump bodily with the crank shaft, 6, the casing, 1, is provided with a socket, 10, formed in a portion, 11, extending transversely of the crank shaft, 2, and designed to receive a bar, 12, which may be the removable handle of the usual hand jack carried on the vehicle, and which will extend laterally into contact with the frame member, 13, of the vehicle. Thus the pump is actually supported on the end of the engine crank shaft, 6, but it is stopped from rotating with the shaft by means of the extending bar, 12.

I claim:—

1. In combination with a rotary power shaft and a frame in which it is journaled, a pump comprising a casing, an actuating shaft journaled therein, and means for supporting the pump on the power shaft including a coupling member on the pump shaft having means for driving engagement with the power shaft, and a lever arm extending from the casing transversely to the axis of the pump shaft, and adapted to be swung by the rotation of the shaft into contact with said frame.

2. In a motor vehicle, in combination with a protruding end of its motor shaft and a frame in which it is journaled, a compressor comprising a casing, an actuating shaft journaled therein, and means for supporting said compressor removably on the protruding end of the aforesaid motor shaft, comprising a coupling member on the pump shaft having means for driving engagement with the motor shaft, and a lever arm extending from the pump casing transversely of the axis of the pump shaft, and adapted to be swung by the rotation of said shaft into contact with said frame.

3. In combination with a rotary power shaft and a frame in which it is journaled, a pump comprising a casing, an actuating shaft journaled therein and means for supporting the pump on the power shaft comprising a coupling member on the pump shaft having means for driving engagement with the power shaft, and a bar removably secured to the pump casing extending therefrom transversely to the axis of the pump shaft for encounter with the aforesaid frame to check the bodily rotation of the pump casing with its shaft.

4. The combination of an engine shaft, a pump detachably supported directly upon said shaft and detachably connected thereto to be operated thereby, and means adjacent said pump to prevent bodily rotation of said pump by said engine shaft.

5. The combination of an engine shaft, and a non-rotatable pump detachably supported directly upon the end of said shaft and detachably connected thereto to be operated by said engine shaft.

6. The combination of an engine shaft, a pump having a shaft detachably coupled to said engine shaft and adapted to be driven thereby, said detachable shaft coupling constituting a support for said pump upon the engine shaft, and means engaging said pump to prevent bodily rotation thereof by said engine shaft.

7. The combination of an engine shaft, a pump having a shaft, and means forming a direct detachable connection between said shafts and a rigid support for the pump upon the end of the engine shaft.

8. The combination with a chassis element having an opening therein and an engine shaft in substantially longitudinal alinement with said opening, of a pump having a shaft, and means for detachably supporting the pump upon the end of said engine shaft independently of said chassis element with the pump shaft detachably connected to the engine shaft.

In testimony whereof I have hereunto set my hand at Chicago, Illinois, this 23rd day of November, 1914.

FRANK A. ROSS.

Witnesses:
C. J. HENDRICKS,
ROBT. N. BURTON.

Copies of this patent may be obtained for five cents each, by addressing the "Commissioner of Patents, Washington, D. C."